(12) United States Patent
Ishida et al.

(10) Patent No.: US 11,158,868 B2
(45) Date of Patent: Oct. 26, 2021

(54) FUEL CELL

(71) Applicant: HONDA MOTOR CO., LTD., Tokyo (JP)

(72) Inventors: Kentaro Ishida, Wako (JP); Seiji Sugiura, Torrance, CA (US); Hiroshi Morikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 37 days.

(21) Appl. No.: 16/682,347

(22) Filed: Nov. 13, 2019

(65) Prior Publication Data

US 2021/0143451 A1    May 13, 2021

(51) Int. Cl.
    *H01M 8/0263*    (2016.01)
    *H01M 8/1006*    (2016.01)

(52) U.S. Cl.
    CPC ....... *H01M 8/0263* (2013.01); *H01M 8/1006* (2013.01)

(58) Field of Classification Search
    CPC ........................ H01M 8/0263; H01M 8/1006
    See application file for complete search history.

(56) References Cited

U.S. PATENT DOCUMENTS

2011/0097641 A1    4/2011  Goto et al.
2018/0131013 A1*   5/2018  Nonoyama ......... H01M 8/0263

FOREIGN PATENT DOCUMENTS

JP    2009-301996 A    12/2009

* cited by examiner

*Primary Examiner* — Brian R Ohara
(74) *Attorney, Agent, or Firm* — Carrier Blackman & Associates, P.C.; William D. Blackman; Joseph P. Carrier

(57) ABSTRACT

A plurality of anode wavy portions provided in an anode separator of a fuel cell have wavy patterns in the same phase, and are arranged in an amplitude direction of the anode wavy portions at a first pitch. A plurality of cathode wavy portions provided in a cathode separator have wavy patterns in the same phase but in reverse phase with respect to the anode wavy portions, and are arranged in an amplitude direction of the cathode wavy portions at a second pitch. The first pitch and the second pitch have different sizes.

4 Claims, 10 Drawing Sheets

FUEL CELL

BACKGROUND OF THE INVENTION

Field of the Invention

The present invention relates to a fuel cell including an anode flow field for supplying a fuel gas to an anode, and a cathode flow field for supplying an oxygen-containing gas to a cathode.

Description of the Related Art

For example, a solid polymer electrolyte fuel cell includes a membrane electrode assembly (MEA) including an electrolyte membrane as a polymer ion exchange membrane, an anode provided on one side of the electrolyte membrane, and a cathode provided on the other side of the electrolyte membrane. The membrane electrode assembly is held between a pair of separators. A predetermined surface pressure is applied to the membrane electrode assembly through the separators. An anode flow field is provided in a separator (anode separator) provided on the anode side of the membrane electrode assembly, for supplying a fuel gas to the anode. A cathode flow field is provided in a separator (cathode separator) provided on the cathode side of the membrane electrode assembly, for supplying an oxygen-containing gas to the cathode.

For example, as described in Japanese Laid-Open Patent Publication No. 2009-301996, a plurality of anode wavy portions protruding toward the anode may be provided in the anode separator, and the anode flow field may be formed between the anode wavy portions that are adjacent to each other in an amplitude direction. Likewise, a plurality of cathode wavy portions protruding toward the cathode may be provided in the cathode separator, and the cathode flow field may be formed between the cathode wavy portions that are adjacent to each other in an amplitude direction. Each of the anode wavy portions and the cathode wavy portions extends in a serpentine wavy pattern. The anode wavy portions are arranged in the amplitude direction at a constant pitch. Further, the cathode wavy portions are arranged in the amplitude direction at a constant pitch.

The anode wavy portions and the cathode wavy portions are in the same phase in the state where the MEA is interposed between the anode wavy portions and the cathode wavy portions. Further, the pitch between the anode wavy portions in the amplitude direction and the pitch between the cathode wavy portions in the amplitude direction have the same size. In the structure, the substantially entire anode wavy portions and the substantially entire cathode wavy portions face each other with the membrane electrode assembly interposed in between. Stated otherwise, the substantially entire anode flow field provided between the anode wavy portions that are adjacent to each other in the amplitude direction and the substantially entire cathode flow field provided between the cathode wavy portions that are adjacent to each other in the amplitude direction face each other with the membrane electrode assembly interposed in between.

SUMMARY OF THE INVENTION

In the membrane electrode assembly, portions held between the anode wavy portions and the cathode wavy portions protruding toward the membrane electrode assembly are high surface pressure portions where the surface pressure applied through the separators is high in comparison with the portion interposed between the anode flow field and the cathode flow field. As described above, in the case where the anode wavy portions and the cathode wavy portions are in the same phase, and the pitches of the anode wavy portions and the cathode wavy portions in the amplitude direction are the same, in the membrane electrode assembly, the high surface pressure portions are formed in a concentrated manner in portions where the substantially entire anode wavy portions and the substantially entire cathode wavy portions face each other. That is, the plurality of high surface pressure portions are arranged regularly in the membrane electrode assembly, and the area of each of the high surface pressure portions tends to be large.

In this regard, in the step of producing the fuel cell, for example, the stack position between the anode wavy portions and the cathode wavy portions through the membrane electrode assembly may be deviated from the intended target position. As described above, in the fuel cell where the high surface pressure portions are provided regularly, and each of the high surface pressure portions has a wide area, when production errors and/or assembling errors occur, the area and/or the shape, etc. of each of the high surface pressure portions may change significantly due to the change of the size and/or the shape of the portions facing the anode wavy portions and the cathode wavy portions. Therefore, there is a concern that the surface pressure applied to the membrane electrode assembly is increased locally.

In an attempt to address the problem, an object of the present invention is to provide a fuel cell in which even if production errors and/or assembling errors occur, it is possible to suppress local increase in the surface pressure applied to the membrane electrode assembly through the anode separator and the cathode separator.

According to one aspect of the present invention, a fuel cell is provided. The fuel cell includes a membrane electrode assembly, an anode separator, and a cathode separator. The membrane electrode assembly includes an electrolyte membrane, and an anode and a cathode on opposite sides of the electrolyte membrane. The anode separator is stacked on the anode of the membrane electrode assembly. The anode separator includes a plurality of anode wavy portions protruding toward the anode. The anode separator is formed with an anode flow field including wavy channels between the plurality of anode wavy portions for allowing a fuel gas to flow along the anode. A cathode separator is stacked on the cathode of the membrane electrode assembly. The cathode separator includes a plurality of cathode wavy portions protruding toward the cathode. The cathode separator is formed with a cathode flow field including wavy channels between the plurality of cathode wavy portions for allowing an oxygen-containing gas to flow along the cathode. The plurality of anode wavy portions have wavy patterns in the same phase as each other, and are arranged in an amplitude direction of the anode wavy portions at a first pitch. The plurality of cathode wavy portions have wavy patterns in the same phase as one another but in reverse phase to the anode wavy portions, and are arranged in an amplitude direction of the cathode wavy portions at a second pitch. The first pitch and the second pitch have different sizes. The anode wavy portion includes an anode top configured to contact the anode, and the cathode wavy portion includes a cathode top configured to contact the cathode. A width of the anode top and a width of the cathode top are the same. In this aspect of the invention, the width of the wavy channel of the anode flow field and the width of the wavy channel of the cathode flow field are the same.

In the fuel cell, the anode wavy portions and the cathode wavy portions are in reverse phase. Further, the first pitch of the anode wavy portions adjacent to each other in the amplitude direction and the second pitch of the cathode wavy portions adjacent to each other in the amplitude direction have different sizes. In the structure, the high surface pressure portions which are parts of the membrane electrode assembly held between the anode wavy portions and the cathode wavy portions are provided in a dispersed manner in the membrane electrode assembly.

In the high surface pressure portions provided in the dispersed manner as described above, for example, in comparison with the high surface pressure portions which are formed regularly in wide areas in the membrane electrode assembly where the anode wavy portions and the cathode wavy portions are in the same phase and the pitches of the anode wavy portions and the cathode wavy portions in the amplitude direction are the same, even if production errors and/or assembling errors occur, it is possible to suppress significant change of the areas and the shapes of the high surface pressure portions. Moreover, it is possible to suppress local increase in the surface pressure applied to the membrane electrode assembly through the separators.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
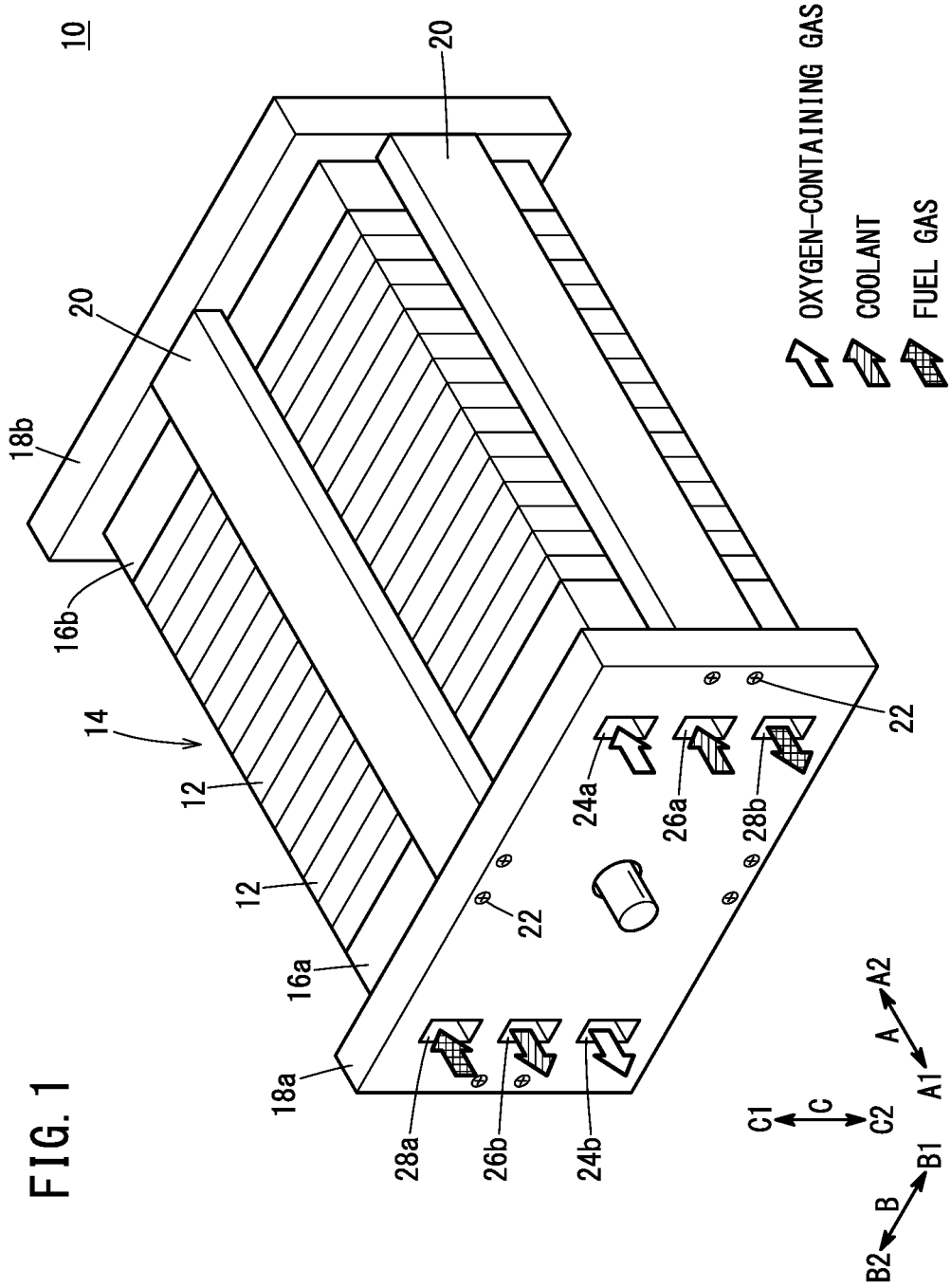
FIG. 1 is an overall perspective view schematically showing a fuel cell according to an embodiment of the present invention.

Preferred embodiments of a fuel cell according to the present invention will be described with reference to the accompanying drawings in detail. In the following drawings, the constituent elements that offer the same or equivalent functions and advantages are labeled with the same reference numerals, and repeated explanations of such constituent elements may be omitted.

As shown in FIG. 1, for example, a fuel cell 10 according to an embodiment of the present invention can be mounted in and used in a fuel cell electric vehicle (not shown), or the fuel cell 10 can be used in a stationary manner. Further, in the embodiment of the present invention, the fuel cell 10 is in a form of a stack (fuel cell stack) including a stack body 14 formed by stacking a plurality of power generation cells 12 in a direction indicated by an arrow A.

At one end of the stack body 14 in a stacking direction (indicated by an arrow A1), a terminal plate (not shown) is provided. An insulator 16a is provided outside the terminal plate, and an end plate 18a is provided outside the insulator 16a. At the other end of the stack body 14 in the stacking direction (indicated by an arrow A2), a terminal plate (not shown) is provided. An insulator 16b is provided outside the terminal plate, and an end plate 18b is provided outside the insulator 16b.

Each of the end plates 18a, 18b has a laterally elongated (or longitudinally elongated) shape. Coupling bars 20 are coupled between the sides of the end plates 18a, 18b. Both ends of each of the bars 20 are fixed to inner surfaces of the end plates 18a, 18b via bolts 22, for applying a tightening load to the stacked power generation cells 12 in the stacking direction (indicated by the arrow A). The fuel cell 10 may have a casing (not shown) including the end plates 18a, 18b, and the stack body 14 may be placed in the casing.

At one end in a longitudinal direction (end in a direction indicated by an arrow B1) of each of the end plates 18a, 18b and the power generation cells 12, an oxygen-containing gas supply passage 24a, a coolant supply passage 26a, and a fuel gas discharge passage 28b are arranged in a direction indicated by an arrow C. The oxygen-containing gas supply passage 24a, the coolant supply passage 26a, and the fuel gas discharge passage 28b extend through the end plates 18a, 18b, and the power generation cells 12 in the stacking direction (indicated by the arrow A). An oxygen-containing gas is supplied to the oxygen-containing gas supply passage 24a. A coolant is supplied to the coolant supply passage 26a. A fuel gas such as a hydrogen-containing gas is discharged from the fuel gas discharge passage 28b.

At the other end in the longitudinal direction (end in a direction indicated by an arrow B2) of each of the end plates 18a, 18b and the power generation cells 12, a fuel gas supply passage 28a, a coolant discharge passage 26b, and an oxygen-containing gas discharge passage 24b are arranged in the direction indicated by the arrow C. The fuel gas supply passage 28a, the coolant discharge passage 26b, and the oxygen-containing gas discharge passage 24b extend through the end plates 18a, 18b, and the power generation cells 12 in the stacking direction. The fuel gas is supplied to the fuel gas supply passage 28a. The coolant is discharged from the coolant discharge passage 26b. The oxygen-containing gas is discharged from the oxygen-containing gas discharge passage 24b. It should be noted that the layout and the shapes of the oxygen-containing gas supply passage 24a, the oxygen-containing gas discharge passage 24b, the fuel gas supply passage 28a, the fuel gas discharge passage 28b, the coolant supply passage 26a, and the coolant discharge passage 26b (hereinafter also referred to as the "fluid passages", collectively) are not limited to the illustrated embodiment. The fluid passages may be designed as necessary depending on the required specification.

Figure 2:
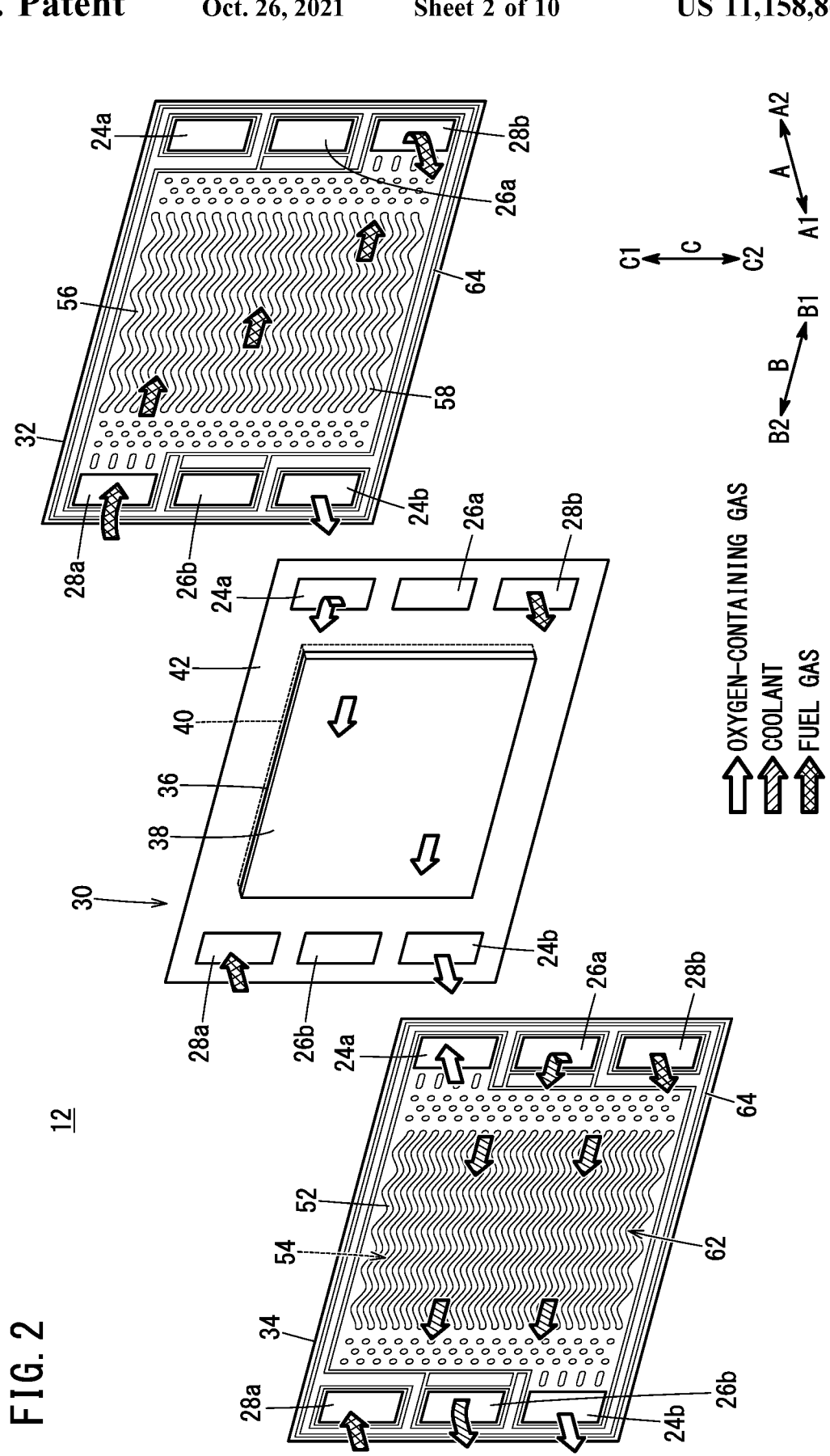
FIG. 2 is an exploded perspective view showing a power generation cell.

As shown in FIG. 2, the power generation cell 12 includes a membrane electrode assembly 30, and an anode separator 32 and a cathode separator 34 sandwiching the membrane electrode assembly 30 from both sides. As described above, a tightening load is applied by the coupling bars 20 in FIG. 1, whereby a surface pressure is applied to the membrane electrode assembly 30 of each of the power generation cells 12 through the anode separator 32 and the cathode separator 34.

The membrane electrode assembly 30 includes an electrolyte membrane 36, and a cathode 38 and an anode 40 provided on both sides of the electrolyte membrane 36. A resin frame member 42 in the form of a film is provided over the entire periphery of an outer peripheral portion of the membrane electrode assembly 30. For example, the electrolyte membrane 36 is formed by a fluorine based electrolyte such as a thin membrane of perfluorosulfonic acid containing water. Alternatively, an HC (hydrocarbon) based electrolyte may be used to form the electrolyte membrane 36.

Figure 6:
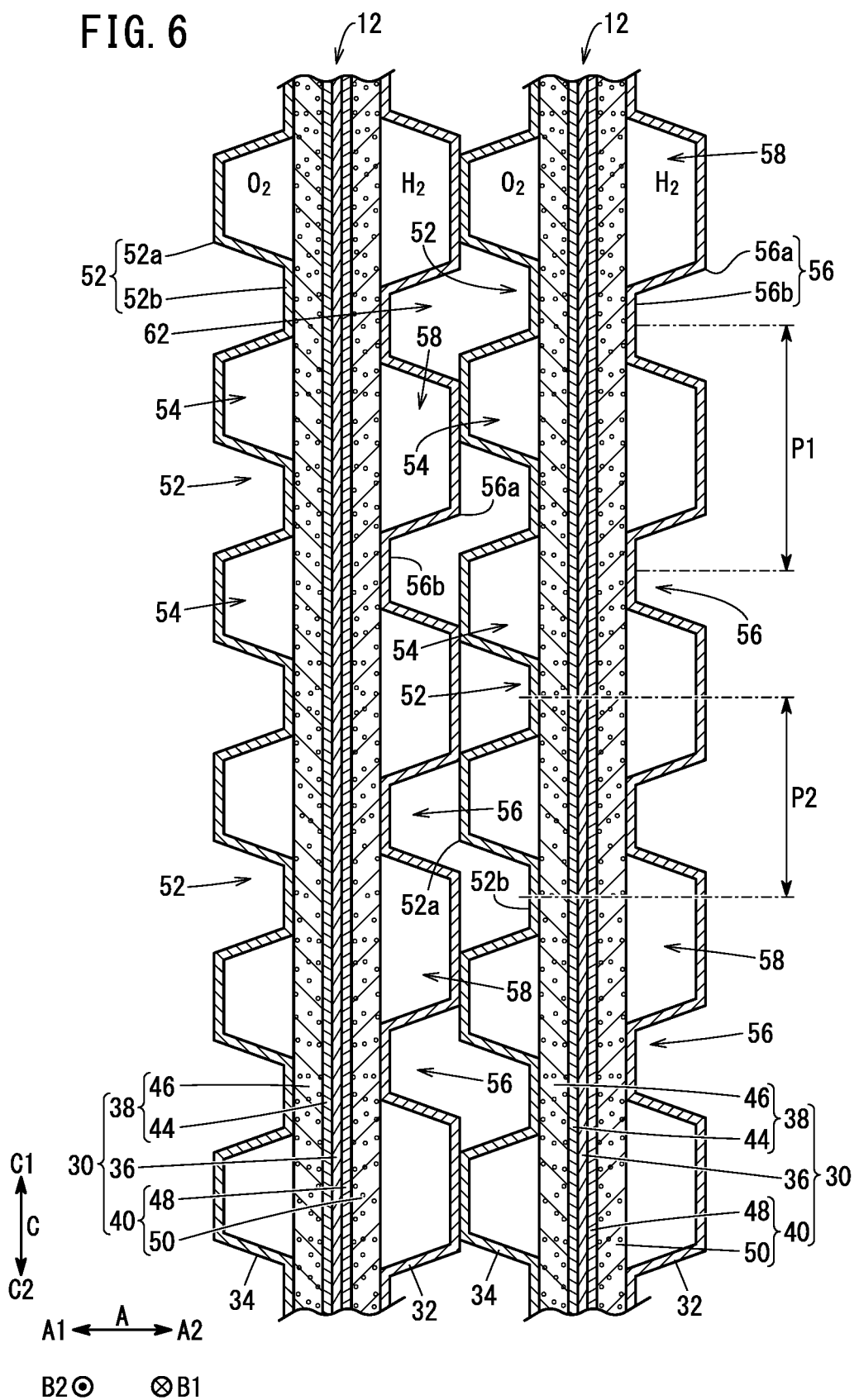
FIG. 6 is a schematic cross sectional view taken along a line VI-VI in FIG. 5, showing two power generation cells that are stacked together.

As shown in FIG. 6, the cathode 38 includes a cathode catalyst layer 44 joined to a surface of the electrolyte membrane 36 on a side indicated by an arrow A1, and a cathode gas diffusion layer 46 stacked on the cathode catalyst layer 44. The cathode catalyst layer 44 is formed by porous carbon particles deposited uniformly on the surface of the cathode gas diffusion layer 46 with platinum alloy supported on the surfaces of the porous carbon particles.

The anode 40 includes an anode catalyst layer 48 joined to a surface of the electrolyte membrane 36 on a side indicated by an arrow A2, and an anode gas diffusion layer 50 stacked on the anode catalyst layer 48. The anode catalyst layer 48 is formed by porous carbon particles deposited uniformly on the surface of the anode gas diffusion layer 50 and platinum alloy supported on the surfaces of the porous carbon particles.

The cathode gas diffusion layer 46 and the anode gas diffusion layer 50 are formed of carbon paper, carbon cloth, etc. As shown in FIG. 2, a resin frame member 42 is held between an outer marginal portion of the cathode gas diffusion layer 46 and an outer marginal portion of the anode gas diffusion layer 50.

As shown in FIGS. 2 and 6, each of the cathode separator 34 and the anode separator 32 is made of metal, carbon, etc. For example, each of the cathode separator 34 and the anode separator 32 is a metal separator produced by press-forming a steel plate, a stainless steel plate, an aluminum plate, a plated steel plate, or a metal plate having an anti-corrosive surface by surface treatment to have a corrugated shape in cross section.

As shown in FIG. 6, the cathode separator 34 is stacked on the cathode 38 side of the membrane electrode assembly 30, and includes a plurality of cathode wavy portions 52 protruding toward the cathode 38. Wavy channels of a cathode flow field 54 are formed between the cathode wavy portions 52 that are adjacent to each other in a direction indicated by the arrow C (amplitude direction). The cathode flow field 54 allows the oxygen-containing gas to flow along the cathode 38.

The anode separator 32 is stacked on the anode 40 side of the membrane electrode assembly 30 and includes a plurality of anode wavy portions 56 protruding toward the anode 40. Wavy channels of an anode flow field 58 are formed between the anode wavy portions 56 that are adjacent to each other in the direction indicated by the arrow C (amplitude direction). The anode flow field 58 allows the fuel gas to flow along the anode 40.

As viewed in a direction indicated by an arrow B, the cathode wavy portion 52 includes an opening 52a on a side indicated by the arrow A1 and a cathode top 52b which contacts the cathode 38 (cathode gas diffusion layer 46), on a side indicated by the arrow A2. In other words, the opening 52a and the cathode top 52b face each other in the direction indicated by the arrow A. The anode wavy portion 56 includes an opening 56a on a side indicated by the arrow A2, and an anode top 56b which contacts the anode 40 (anode gas diffusion layer 50), on a side indicated by the arrow A1. In other words, the opening 56a and the anode top 56b face each other in the direction indicated by the arrow A. In the embodiment of the present invention, the width of the cathode top 52b (length in a direction indicated by an arrow C) and the width of the anode top 56b (length in the direction indicated by the arrow C) are substantially equal.

Further, as viewed in the direction indicated by the arrow B, the width of the cathode wavy portion 52 in the direction indicated by the arrow C is decreased from the opening 52a (on the side indicated by the arrow A1) toward the cathode top 52b (on the side indicated by the arrow A2). The width of the anode wavy portion 56 in the direction indicated by the arrow C is decreased from the opening 56a (on the side indicated by the arrow A2) toward the anode top 56b (on the side indicated by the arrow A1).

Figure 3:
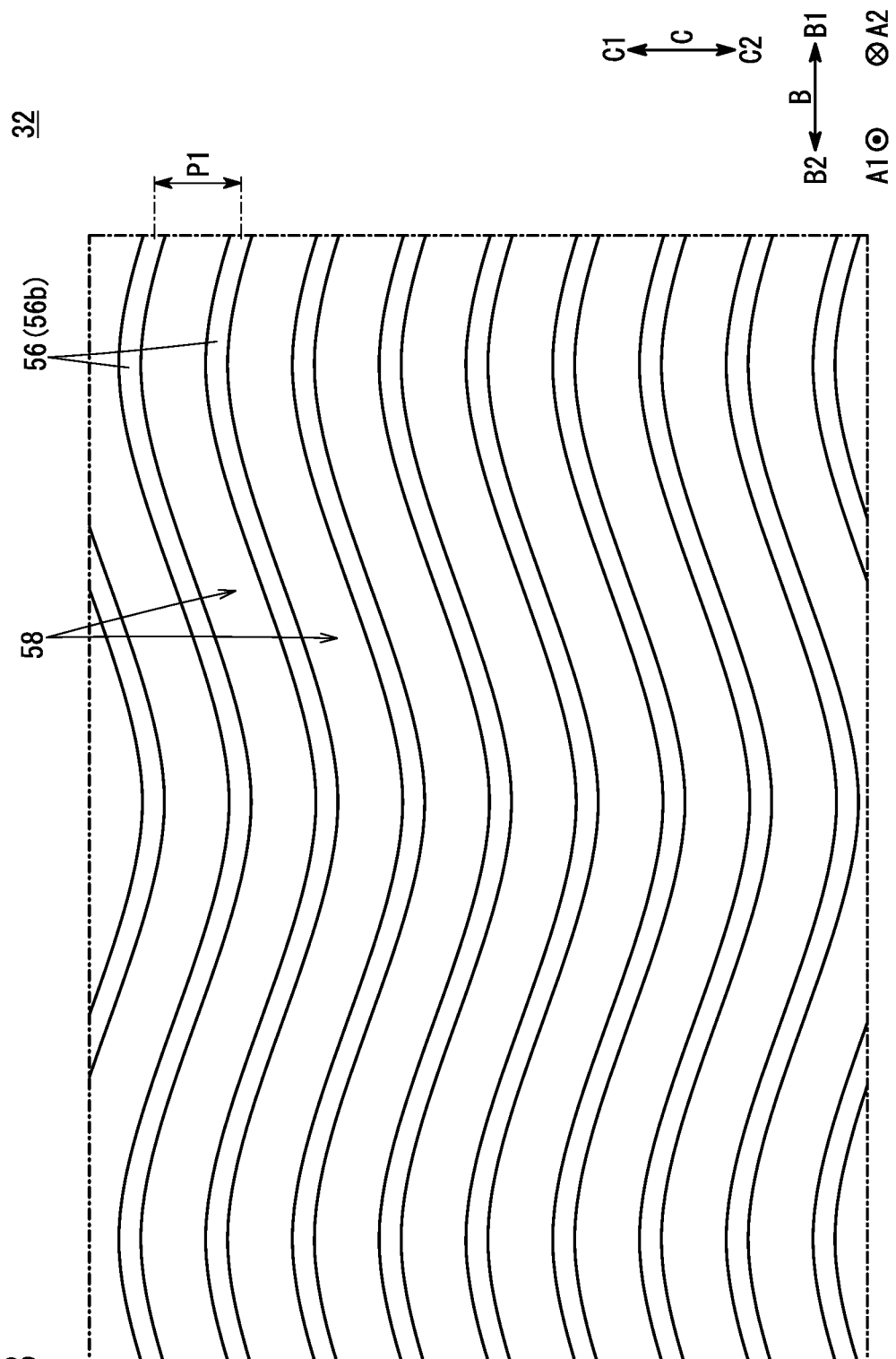
FIG. 3 is a view showing anode wavy portions.

As shown in FIGS. 2 and 3, each of the anode wavy portions 56 extends meandering in the direction indicated by the arrow B—extending in a periodic wavy pattern—with the direction indicated by the arrow C being the amplitude direction. The plurality of anode wavy portions 56 are in the same phase. Further, as shown in FIG. 3, the adjacent anode wavy portions 56 are arranged at a first pitch P1 in the amplitude direction. For example, the first pitch P1 is the distance between reference positions that are, for example, centers in the amplitude direction of the anode wavy portions 56.

Figure 4:
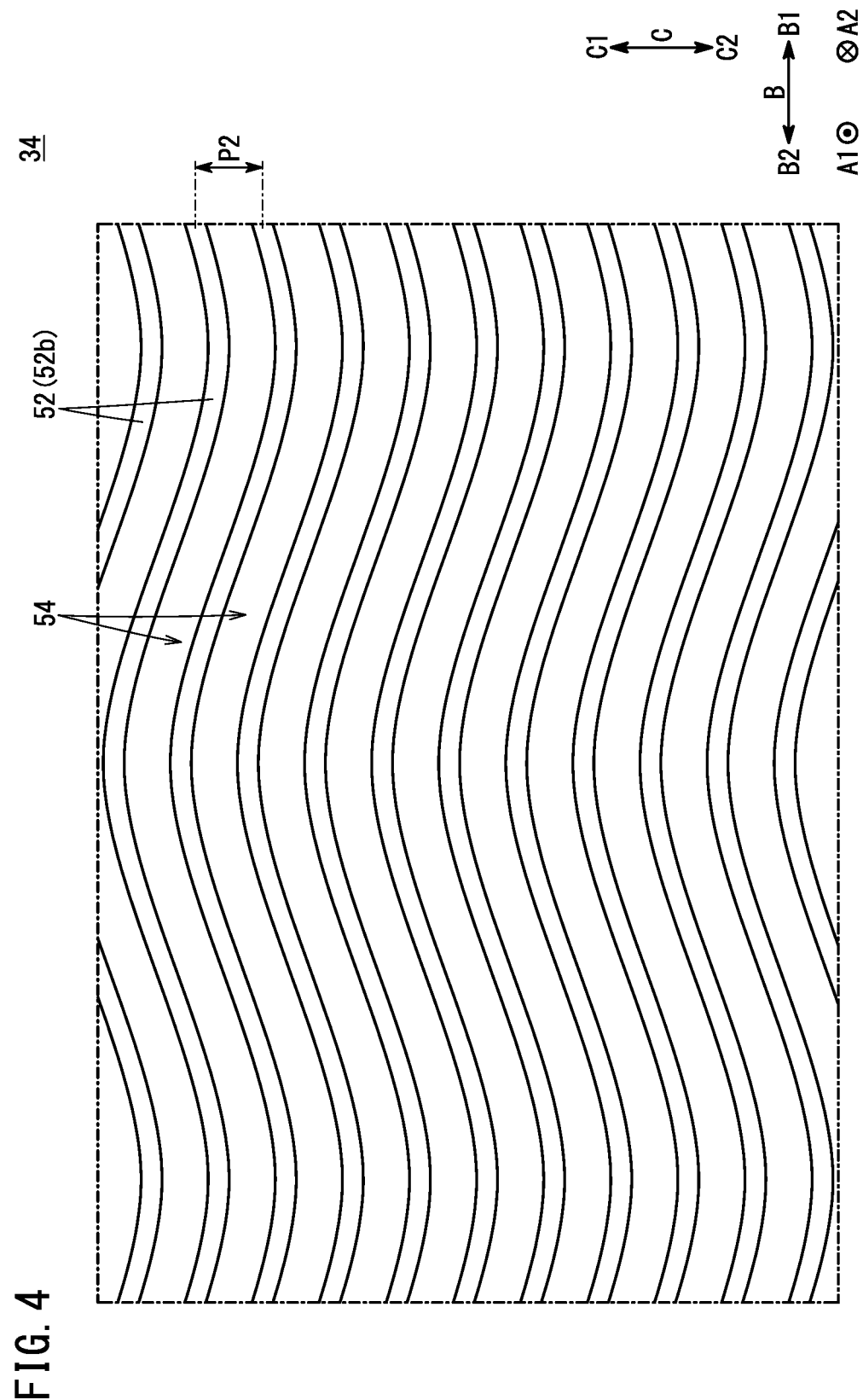
FIG. 4 is a view showing cathode wavy portions.

As shown in FIGS. 2 and 4, each of the cathode wavy portions 52 extends meandering in the direction indicated by the arrow B—extending in a periodic wavy pattern—with the direction indicated by the arrow C being the amplitude direction. The plurality of cathode wavy portions 52 are in the same phase. The cathode wavy portions 52 and the anode wavy portions 56 (FIGS. 3 and 5) are in reverse phase. It should be noted that the reverse phase herein means not only the phase difference of 180° but also the phase difference of substantially 180°. Further, as shown in FIG. 4, the adjacent cathode wavy portions 52 are arranged at the second pitch P2 in the amplitude direction. For example, the second pitch P2 is the distance between reference positions that are, for example, centers in the amplitude direction of the cathode wavy portions 52. The first pitch P1 of the anode wavy portions 56 and the second pitch P2 of the cathode wavy portions 52 have different sizes. In the embodiment of the present invention, the second pitch P2 is smaller than the first pitch P1 (first pitch P1>second pitch P2).

Figure 5:
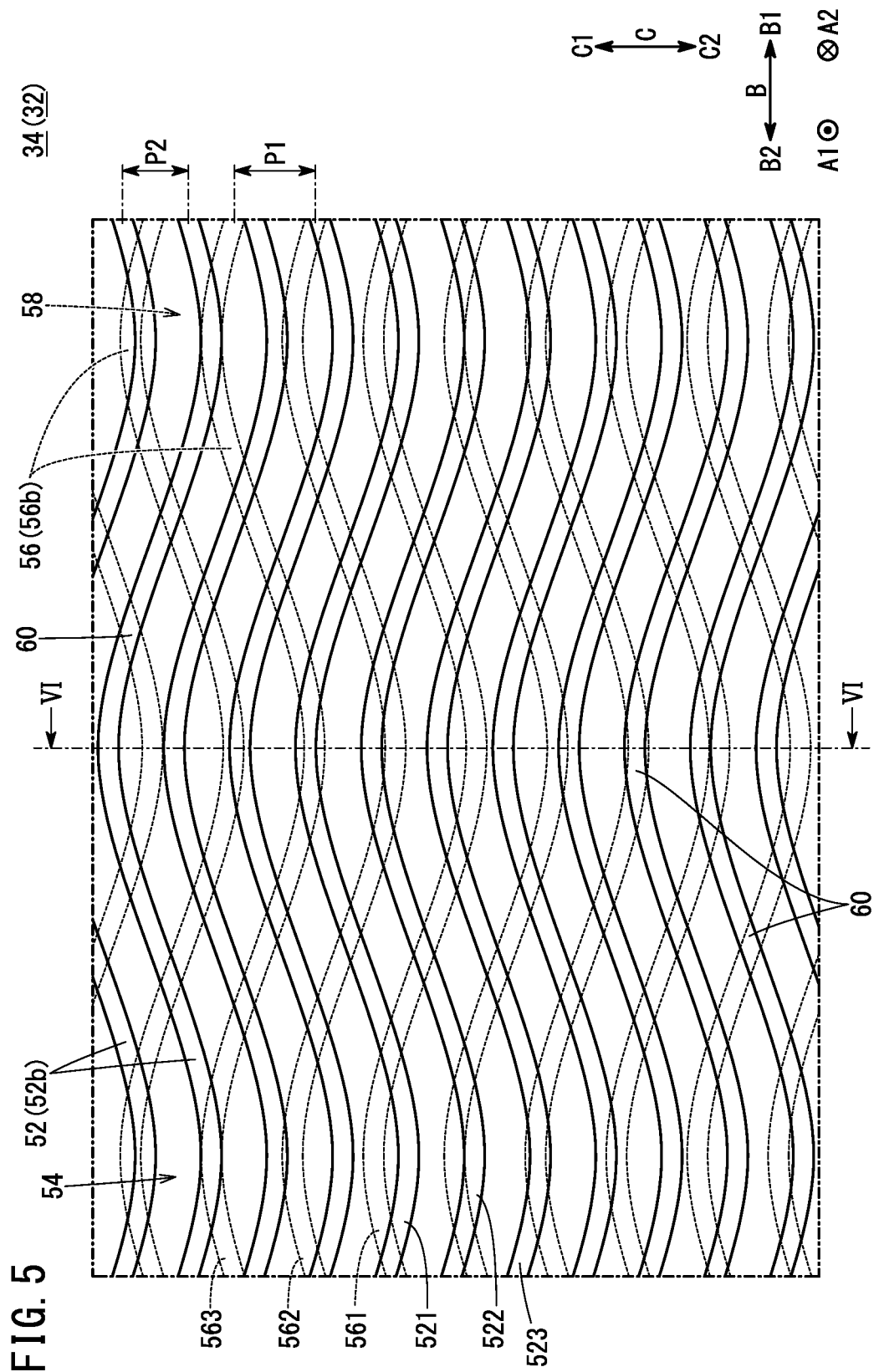
FIG. 5 is a view showing the positional relationship between the anode wavy portions and the cathode wavy portions that are stacked together.

Further, as shown in FIG. 5, as viewed in the stacking direction (indicated by the arrow A) of the anode wavy portions 56 and the cathode wavy portions 52, one cathode wavy portion 52 has a part that intersects with two or more anode wavy portions 56. In the embodiment of the present invention, one cathode wavy portion 52 (521) intersects with three anode wavy portions 56 (561, 562, 563). Further, as viewed in the direction indicated by the arrow A, one anode wavy portion 56 has a part that intersects with two or more cathode wavy portions 52. In the embodiment of the present invention, one anode wavy portion 56 (561) intersects with three cathode wavy portions 52 (521, 522, 523). It should be noted that the anode wavy portions 56 and the cathode wavy portions 52 can be arranged to intersect with each other by adjusting the amplitudes of the anode wavy portions 56 and the cathode wavy portions 52, and the first pitch P1 and the second pitch P2, etc.

As shown in FIGS. 5 and 6, the anode wavy portions 56 and the cathode wavy portions 52 are in reverse phase, and have different sizes of the first pitch P1 and the second pitch P2. The anode wavy portions 56 and the cathode wavy portions 52 partially face each other with the membrane electrode assembly 30 interposed in between. In the membrane electrode assembly 30, the parts held between the anode tops 56b of the anode wavy portions 56 and the cathode tops 52b of the cathode wavy portions 52 form high surface pressure portions 60 (FIG. 7) where the surface pressure applied to the high surface pressure portions 60 through the anode separator 32 and the cathode separator 34 are higher than the surface pressure applied to the positions between the anode flow field 58 and the cathode flow field 54. As shown by filled portions in FIG. 7, for example, the high surface pressure portions 60 are positioned in a dispersed manner in the membrane electrode assembly 30.

The anode flow field 58 is connected to the fuel gas supply passage 28a and the fuel gas discharge passage 28b in FIG. 2. Further, as described above, parts of the anode flow field 58 formed between the adjacent anode wavy portions 56 have a wavy pattern corresponding to the shape of the anode wavy portions 56. The cathode flow field 54 is connected to the oxygen-containing gas supply passage 24a and the oxygen-containing gas discharge passage 24b in FIG. 2. Further, as described above, parts of cathode flow field 54 formed between the adjacent cathode wavy portions 52 have a wavy pattern corresponding to the shape of the cathode wavy portions 52.

In the present embodiment, the second pitch P2 is smaller than the first pitch P1 and thus, as shown in FIG. 6, in a given area for power generation, the number of channels of the cathode flow field 54 adjacent to the membrane electrode assembly 30 is larger than the number of channels of the anode flow field 58. Further, since the second pitch P2 is smaller than the first pitch P1, and as described above, the width of the anode top 56b and the width of the cathode top 52b are the substantially same, the width of the channels in the anode flow field 58 in the direction indicated by the arrow C is larger than the width of the channels in the cathode flow field 54 in the direction indicated by the arrow C.

As shown in FIGS. 2 and 6, the cathode separator 34 and the anode separator 32 of the power generation cells 12 that are adjacent to each other, have outer peripheral portions joined together by welding, etc. A coolant flow field 62 is formed between the cathode separator 34 and the anode separator 32 that are joined together as described above. The coolant flow field 62 is connected to the coolant supply passage 26a and the coolant discharge passage 26b of FIG. 2.

The cathode separator 34 and the anode separator 32 are provided with integral or separate elastic rubber seal members 64. The rubber seal member 64 provided for the cathode separator 34 surrounds the outer periphery of the reaction surface where the cathode flow field 54 of the cathode separator 34 is provided, and surrounds the outer periphery of each of the fluid passages. The rubber seal member 64 provided for the anode separator 32 surrounds the outer periphery of the reaction surface where the anode flow field 58 of the anode separator 32 is provided, and surrounds the outer periphery of each of the fluid passages. It should be noted that, instead of the rubber seal member 64, an elastic bead (not shown) may be formed integrally with the cathode separator 34 or the anode separator 32 by press forming.

Operation of the fuel cell 10 having the above structure will be described briefly. In the case of performing power generation with the fuel cell 10, as shown in FIGS. 1 and 2, a fuel gas is supplied to the fuel gas supply passage 28a, an oxygen-containing gas is supplied to the oxygen-containing gas supply passage 24a, and a coolant is supplied to the coolant supply passage 26a.

The fuel gas supplied to the fuel gas supply passage 28a flows into the anode flow field 58 of the anode separator 32, and flows along the anode 40. The oxygen-containing gas supplied to the oxygen-containing gas supply passage 24a flows into the cathode flow field 54 of the cathode separator 34 and flows along the cathode 38.

In the membrane electrode assembly 30, the fuel gas supplied to the anode 40 and the oxygen-containing gas supplied to the cathode 38 are consumed in electrochemical reactions of the anode catalyst layer 48 and the cathode catalyst layer 44 to perform power generation. The remaining fuel gas which has not been consumed in the electrochemical reaction is discharged from the fuel gas discharge passage 28b, and the remaining oxygen-containing gas is discharged from the oxygen-containing gas discharge passage 24b.

In the meanwhile, the coolant supplied to the coolant supply passage 26a flows the coolant flow field 62. After the coolant cools the membrane electrode assembly 30, the coolant is discharged from the coolant discharge passage 26b.

Figure 7:
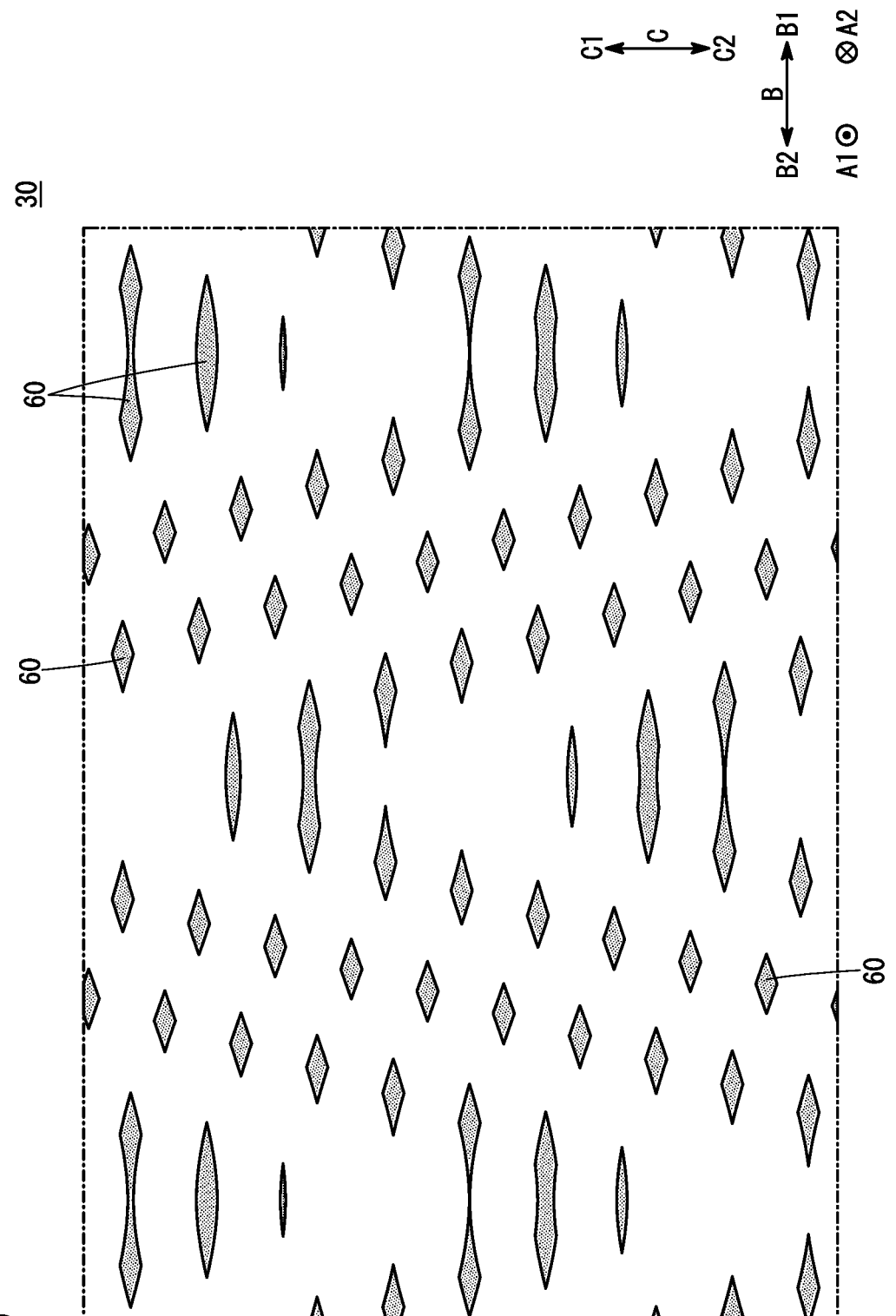
FIG. 7 is a view showing high surface pressure portions formed in a part facing the anode wavy portions and the cathode wavy portions in FIG. 5.

In the fuel cell 10, the anode wavy portions 56 and the cathode wavy portions 52 are in reverse phase. Further, the first pitch P1 between the anode wavy portions 56 that are adjacent to each other in the amplitude direction and the second pitch P2 between the cathode wavy portions 52 that are adjacent to each other in the amplitude direction are not equal. Therefore, as shown in FIG. 7, in the membrane electrode assembly 30, the high surface pressure portions 60 which are parts held between the anode wavy portions 56 (anode tops 56b) and the cathode wavy portions 52 (cathode tops 52b) are provided in a dispersed manner in the membrane electrode assembly 30. That is, the plurality of high surface pressure portions 60 are provided relatively irregularly in the membrane electrode assembly 30, and the area of each of the high surface pressure portions 60 is relatively small.

Figure 8:
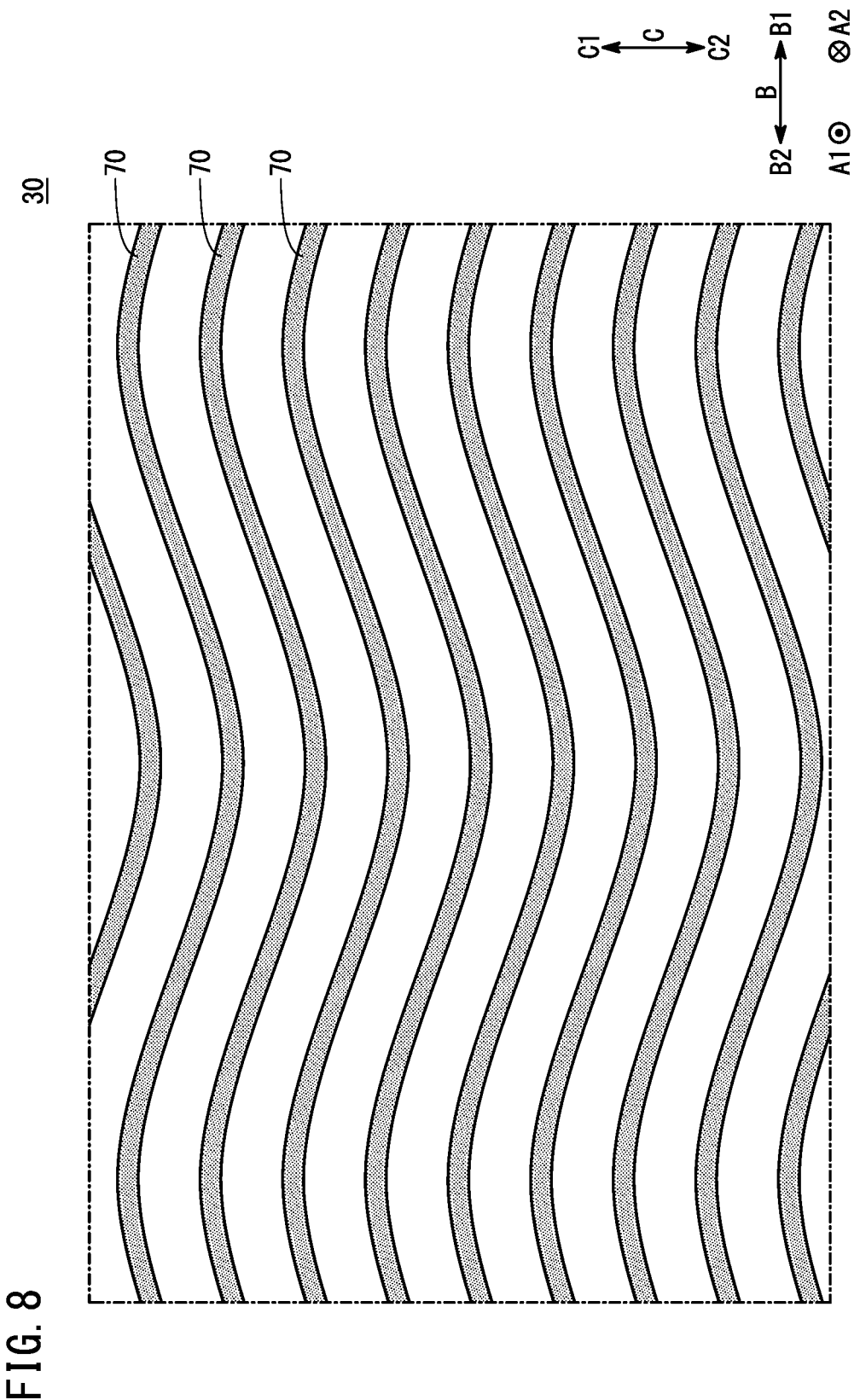
FIG. 8 is a view showing high surface pressure portions formed in the case where the anode wavy portions and the cathode wavy portions are in the same phase, and a first pitch and a second pitch have the same size.

In this regard, as an example, high surface pressure portions 70 are shown in FIG. 8. The high surface pressure portions 70 are formed in the case where the anode wavy portions 56 and the cathode wavy portions 52 are in the same phase and the first pitch P1 and the second pitch P2 are equal. In this case, for example, the substantially entire anode wavy portions 56 in FIG. 6 and the substantially entire cathode wavy portions (not shown) that are in the same phase as, and has the same pitch as the anode wavy portions 56 face each other with the membrane electrode assembly 30 in between. Therefore, as shown in FIG. 8, in the membrane electrode assembly 30, the high surface pressure portions 70 are formed in a concentrated manner in parts where the substantially entire anode wavy portions 56 (anode tops 56b) of FIG. 6 and the substantially entire cathode wavy portions (cathode tops) face each other. That is, the plurality high surface pressure portions 70 are provided regularly in the membrane electrode assembly 30, and the area of each of the high surface pressure portions 70 tends to become relatively large.

In the case where the high surface pressure portions 70 are provided regularly and have larger areas as described above, when the size and/or the shape of the parts where the anode wavy portions 56 and the cathode wavy portion face each other change due to production errors, assembling errors, etc., the area, the shape, etc. of each of the high surface pressure portions 70 tend to change significantly. Moreover, there is a concern that the surface pressure applied to the membrane electrode assembly 30 is increased locally.

Figure 9:
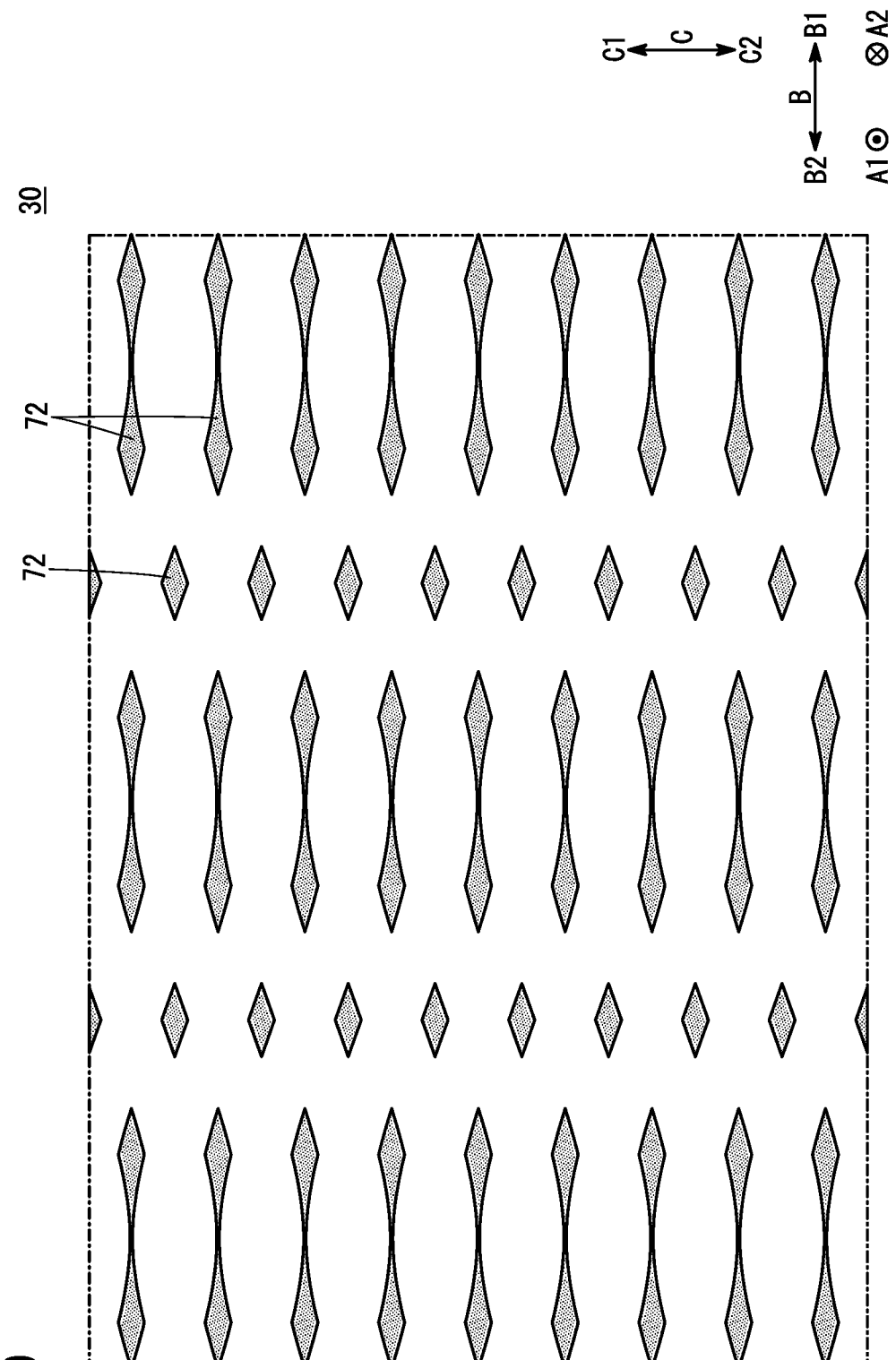
FIG. 9 is a view showing high surface pressure portions formed in the case where the anode wavy portions and the cathode wavy portions are in reverse phase, and the first pitch and the second pitch have the same size.

An example of high surface pressure portions 72 are shown in FIG. 9 where the anode wavy portions 56 and the cathode wavy portions 52 are in reverse phase, and the first pitch P1 and the second pitch P2 are equal. It can be understood that, in comparison with the high surface pressure portions 70 in FIG. 8, the high surface pressure portions 72 in FIG. 9 are provided in a more dispersed manner in the membrane electrode assembly 30, and the area of each of the high surface pressure portions 72 is smaller.

Based on comparison of FIGS. 8 and 9 with FIG. 7, it can be understood that in comparison with the high surface pressure portions 70 in FIG. 8 and the high surface pressure portions 72 in FIG. 9, the high surface pressure portions 60 of the fuel cell 10 according to the embodiment of the present invention are dispersed more suitably in the membrane electrode assembly 30 and it is possible to more effectively reduce the area of each of the high surface pressure portions 60. As described above, in the high surface pressure portions 60 in FIG. 7 provided in a dispersed manner, for example, in comparison with the high surface pressure portions 70 in FIG. 8 and the high surface pressure portions 72 in FIG. 9, even in the case where production errors and/or assembling errors occur, it is possible to suppress significant changes of the area and/or the shape of each of the high surface pressure portions 60. Moreover, it is possible to suppress local increase of the surface pressure applied to the membrane electrode assembly 30 through the anode separator 32 and the cathode separator 34.

In the fuel cell 10 according to the above embodiment, the second pitch P2 is smaller than the first pitch P1. Additionally, in the above embodiment, the width of the anode top 56b and the width of the cathode top 52b are substantially the same. Therefore, the width of the channels in the anode flow field 58 is larger than the width of the channels in the cathode flow field 54.

The oxygen-containing gas flowing the cathode flow field 54 is diffused less than the fuel gas flowing the anode flow field 58. Therefore, as described above, the second pitch P2 is made smaller than the first pitch P1 to increases the number of channels in the cathode flow field 54 facing the membrane electrode assembly 30, and the cross sectional area that is perpendicular to the direction in which the channels of the cathode flow field 54 extend is reduced, whereby it becomes possible to suppress stagnation of the oxygen-containing gas in the cathode flow field 54, and suitably supply the oxygen-containing gas to the cathode 38. Moreover, it becomes possible to improve the power generation efficiency of the fuel cell 10.

Figure 10:
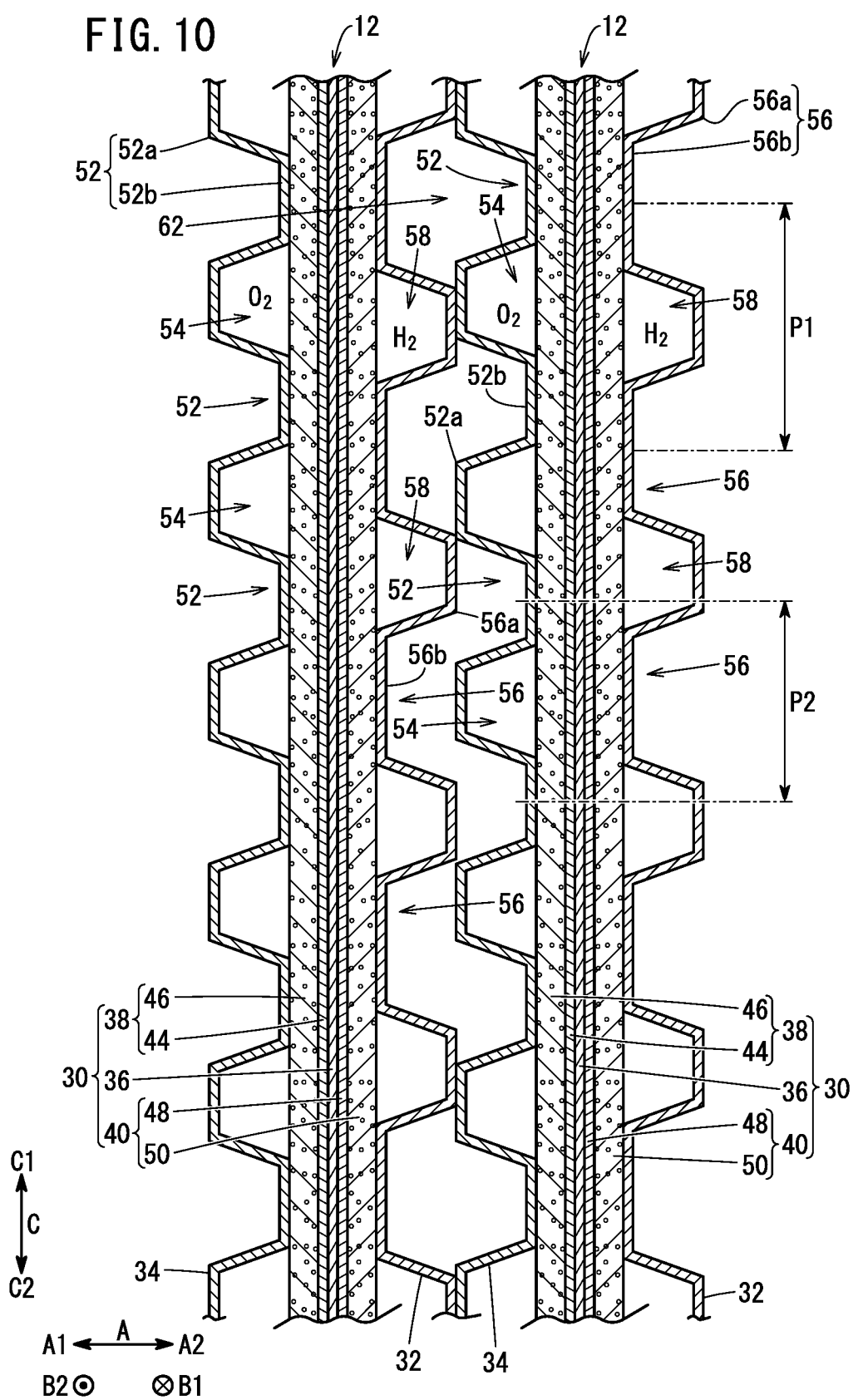
FIG. 10 is a schematic cross sectional view showing anode wavy portions and cathode wavy portions according to a modified embodiment.

However, for example, as shown in FIG. 10, the width of the anode top 56b may be larger than the width of the cathode top 52b. In this case, even when the second pitch P2 is made smaller than the first pitch P1 to increase, in a given area for power generation, the number of channels of the cathode flow field 54 facing the membrane electrode assembly 30 more than the number of channels in the anode flow field 58, it is possible to reduce the difference between the width of the channels in the cathode flow field 54 and the width of channels in the anode flow field 58, or make the width of channels in the cathode flow field 54 and the width of channels in the anode flow field 58 to be the same. In this manner, the cross sectional area of the anode flow field 58 and the cross sectional area of the cathode flow field 54 perpendicular to the extending direction can be equal. Consequently, it becomes possible to obtain stable power generation characteristics of the fuel cell 10.

In the fuel cell 10 according to the embodiment of the present invention, as viewed in the stacking direction of the anode wavy portions 56 and the cathode wavy portions 52, one cathode wavy portion 52 (52a) includes a part that intersects with two or more anode wavy portions 56 (56a, 56b, 56c). In this case, it is possible to provide the high surface pressure portions 60 even more suitably in a dispersed manner in the membrane electrode assembly 30. When production errors and/or assembling errors occur, it becomes possible to more effectively suppress local increase of the surface pressure applied to the membrane electrode assembly 30 through the separators.

The present invention is not limited to the above described embodiments. It is a matter of course that various modifications can be made without departing from the gist of the present invention.

What is claimed is:

1. A fuel cell comprising:
   a membrane electrode assembly including an electrolyte membrane, and an anode and a cathode on opposite sides of the electrolyte membrane;
   an anode separator being stacked on the anode of the membrane electrode assembly, including a plurality of anode wavy portions protruding toward the anode, and being formed with an anode flow field including wavy channels between the plurality of anode wavy portions for allowing a fuel gas to flow along the anode; and
   a cathode separator being stacked on the cathode of the membrane electrode assembly, including a plurality of cathode wavy portions protruding toward the cathode, and being formed with a cathode flow field including wavy channels between the plurality of cathode wavy portions for allowing an oxygen-containing gas to flow along the cathode,
   wherein:
   the plurality of anode wavy portions have wavy patterns in the same phase as one another and are arranged in an amplitude direction of the anode wavy portions at a first pitch;
   the plurality of cathode wavy portions have wavy patterns in the same phase as one another but in reverse phase with respect to the anode wavy portions, and are arranged in an amplitude direction of the cathode wavy portions at a second pitch;
   the first pitch and the second pitch have different sizes;
   the anode wavy portion includes an anode top configured to contact the anode, the cathode wavy portion includes a cathode top configured to contact the cathode, and a width of the anode top and a width of the cathode top are the same;
   and the width of the wavy channel of the anode flow field is larger than the width of the wavy channel of the cathode flow field.

2. The fuel cell according to claim 1, wherein the second pitch is smaller than the first pitch.

3. The fuel cell according to claim 1, wherein, as viewed in a stacking direction of the anode wavy portions and the cathode wavy portions, one of the cathode wavy portions includes a part that intersects with two or more of the anode wavy portions.

4. A fuel cell comprising:
- a membrane electrode assembly including an electrolyte membrane, and an anode and a cathode on opposite sides of the electrolyte membrane;
- an anode separator being stacked on the anode of the membrane electrode assembly, including a plurality of anode wavy portions protruding toward the anode, and being formed with an anode flow field including wavy channels between the plurality of anode wavy portions for allowing a fuel gas to flow along the anode; and
- a cathode separator being stacked on the cathode of the membrane electrode assembly, including a plurality of cathode wavy portions protruding toward the cathode, and being formed with a cathode flow field including wavy channels between the plurality of cathode wavy portions for allowing an oxygen-containing gas to flow along the cathode, wherein:
- the plurality of anode wavy portions have wavy patterns in the same phase as one another and are arranged in an amplitude direction of the anode wavy portions at a first pitch;
- the plurality of cathode wavy portions have wavy patterns in the same phase as one another but in reverse phase with respect to the anode wavy portions, and are arranged in an amplitude direction of the cathode wavy portions at a second pitch having a different size from the first pitch;
- the first pitch and the second pitch have different sizes;
- the anode wavy portion includes an anode top configured to contact the anode;
- the cathode wavy portion includes a cathode top configured to contact the cathode; and
- the width of the anode top is larger than the width of the cathode top; and
- the width of the wavy channel of the anode flow field and the width of the wavy channel of the cathode flow field are the same.

* * * * *